July 3, 1934.  L. F. NENNINGER  1,965,253
VARIABLE SPEED TRANSMISSION FOR MACHINE TOOLS
Filed April 4, 1932  2 Sheets-Sheet 1
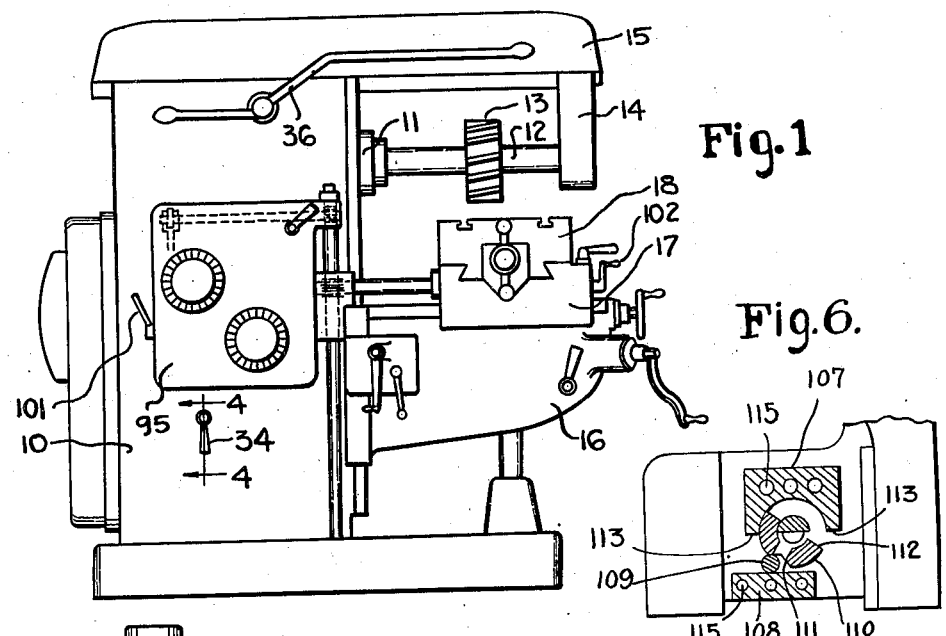
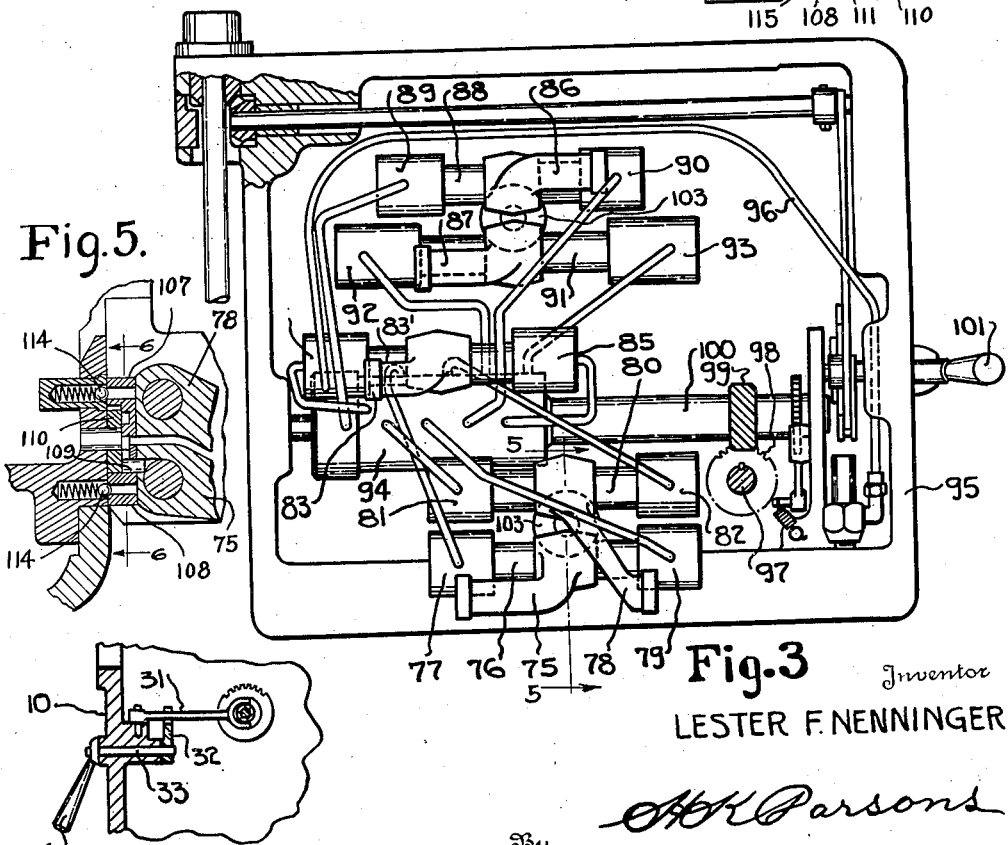
Inventor
LESTER F. NENNINGER
By A. H. K. Parsons
Attorney July 3, 1934.   L. F. NENNINGER   1,965,253
VARIABLE SPEED TRANSMISSION FOR MACHINE TOOLS
Filed April 4, 1932   2 Sheets-Sheet 2

Inventor
LESTER F. NENNINGER
By AHK Parsons
Attorney

Patented July 3, 1934

1,965,253

UNITED STATES PATENT OFFICE 1,965,253

VARIABLE SPEED TRANSMISSION FOR MACHINE TOOLS

Lester F. Nenninger, Cincinnati, Ohio, assignor to The Cincinnati Milling Machine Company, Cincinnati, Ohio, a corporation of Ohio Application April 4, 1932, Serial No. 602,918

13 Claims. (Cl. 74—58)

This invention relates to milling machines and more particularly to an improved transmission and control mechanism therefor.

One of the objects of this invention is to provide an improved speed transmission for the cutter spindle of a milling machine so that advantage may be taken of improved high speed cuting tools which require higher rates of rotation than is possible of development with present transmissions in order to utilize them to the best advantage.

Another object of this invention is to provide an improved variable speed transmission for the spindle of a milling machine which is simple in construction but which will yield a wide selection of speed rates thereby increasing the range and usefulness of the machine.

A further object of this invention is to provide a variable speed transmission for a milling machine spindle in which the speeds are transmitted to the spindle in four series, each series terminating in a final gear secured to the spindle, the final gears being arranged in progressive order in accordance with the load transmitted thereto, whereby the heaviest load will be transmitted through the member closest to the spindle nose and the lightest load transmitted through the member farthest from the spindle nose.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts, Figure 1 is a front elevation of a milling machine embodying the principles of this invention.

Figure 3 is an elevation of the power shifting mechanism with the transmission as viewed from the inside of the machine.

Figure 4 is a detailed section on the line 4—4 of Figure 1.

Figure 5 is a section on the line 5—5 of Figure 3.

Figure 6 is a section on the line 6—6 of Figure 5.

Figures 2, 7:
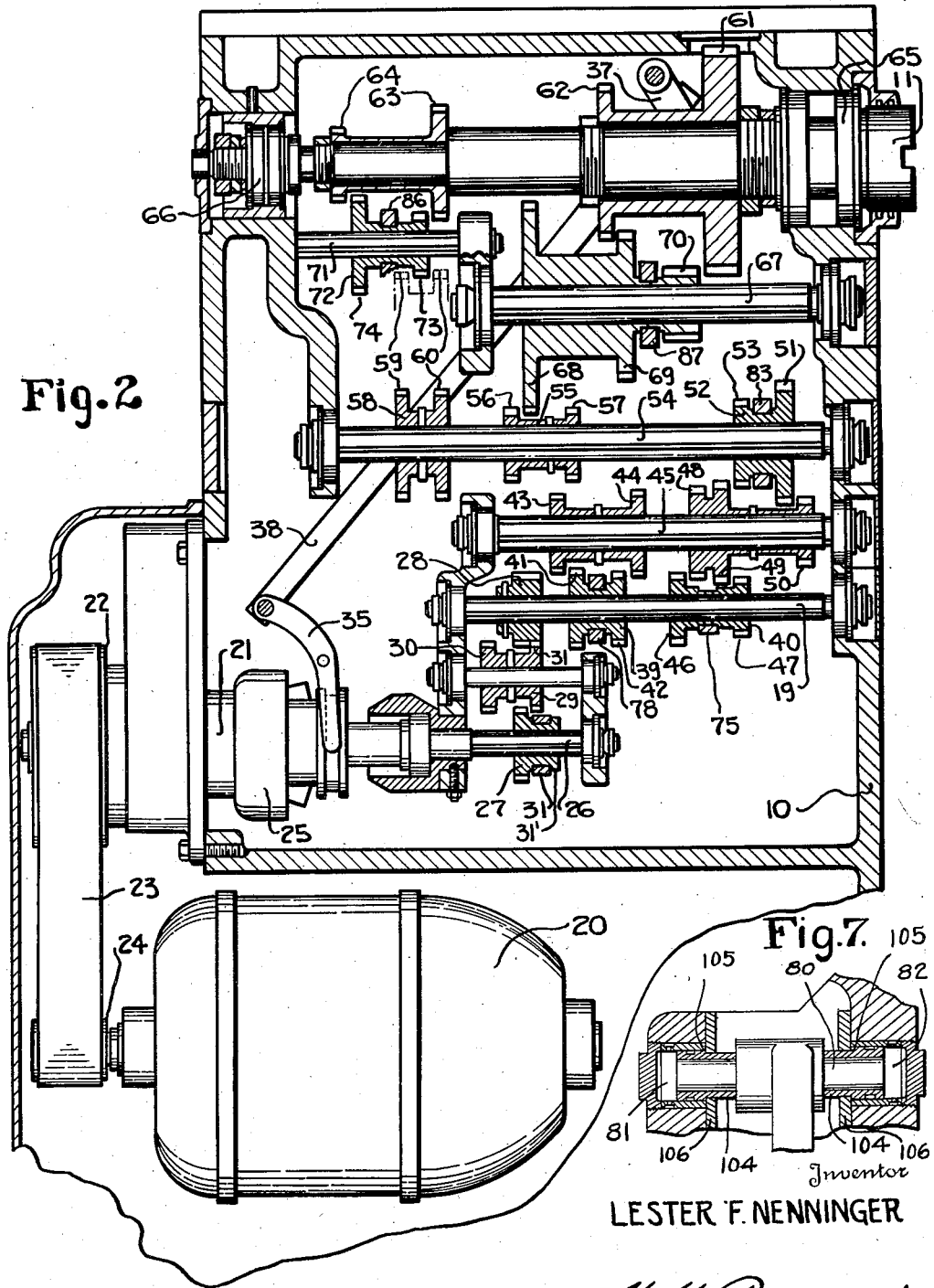
Figure 2 is an expanded view of the variable speed transmission for the spindle.
Figure 7 is a section through the cylinders 81 and 82 of Figure 3.

Milling machines for use in tool rooms and for small lot production jobs are required to have a greater flexibility of adjustment and therefore a wider selection of speed rates than regular production machines, and since the transmission of this invention is designed primarily for such machines which are usually of the knee and column type, it will be illustrated in connection with this type of machine although it will be apparent that it may be utilized with equal success in other styles of machines having the same requirements.

In milling machines of the past it has been customary practice to provide a ratio of one to twenty-five between the highest and lowest speed of a spindle transmission. Improved cutting tools capable of withstanding greater heat and therefore rotatable at higher rates than present tools require transmissions of higher speed rates than are now possible with ordinary transmissions. These higher speed rates in combination with the necessary low speeds result in ratios of the order of one to one-hundred. Such a wide range cannot be encompassed in the present type of transmissions without high ratio step-ups and reductions which cause a great loss in power transmitting efficiency and necessitates the use of large cumbersome gears having high peripheral speeds.

In other words, general practice dictates the use of a pair of final back gears selectively engageable with a pair of gears fixed to the spindle, and half of the total number of speeds of the variable speed transmission is transmitted through one pair of mating gears and the remaining speeds through the other pair of mating gears. If a range of from eighteen to eighteen-hundred R. P. M. is desired, which is in the ratio of one to one-hundred, it will be necessary to transmit the range between eighteen and one-hundred sixty two through one gear pair and the remainder of the range up to eighteen-hundred through the other gear pair. It will be noted that the ratio between the highest and lowest speed of the first range is in the neighborhood of one to nine, and in the second pair approximately one to ten. If proper gears are chosen in order to equalize the step-up and the step-down in each range, it will be seen that the ratio between driver and driven would be approximately one to five on the step-up and five to one on the step-down. Now, it is well known that a step-up of one to five between two gears is most uneconomical and inefficient, especially in this type of transmission in which the highest ratio used is perhaps one to two-and-one-half while the usual ratios are less than one to two.

Furthermore, if the driven gear of the high series pair that is, the one fixed to the spindle, is assumed to be eight inches in diameter, which is about a minimum because the gears on the spindle should be as large in diameter as the largest cutter used on the machine in order to develop the proper torque, it will be seen that the driver would have to be forty inches in diameter to maintain the ratio of five to one. Since the speed ratio would be the same, the driver would rotate at 360 R. P. M. and the driven at 1800 R. P. M. The peripheral speed of the driver would therefore be close to 4000 feet per minute which is very objectionable and even dangerous to use in such transmissions.

Applicant has avoided all these difficulties by departing from standard practice and providing an improved transmission having ratios not over one to three in any given case, while still obtaining a wide range thereby eliminating large gears and high peripheral speeds.

In Figure 1 of the drawings, the reference numeral 10 indicates the column of a milling machine having a cutter spindle 11 journaled in the upper portion thereof for rotating a cutter arbor 12 carrying a cutter 13, the arbor being supported by a pendant 14 attached to the outer end of an over-arm 15 which is adjustably mounted in guideways formed upon the top of the column. The work support comprises a knee 16 adjustably mounted on the front face of the column carrying a saddle 17 for transverse adjustment toward and from the column, the saddle in turn supporting the reciprocating table 18.

The transmission for the spindle is shown more particularly in Figure 2 and comprises a main or primary shaft 19 which is coupled to a prime mover 20 mounted in the lower part of the column by means of the following mechanism.

A clutch shaft 21, journaled in the column, has a drive pulley 22 secured thereto for rotation by a belt 23 which passes around the motor pulley 24. A starting clutch 25 serves to couple the shaft 21 with the coaxial shaft 26. A reversing mechanism for determining the direction of rotation of the spindle is interposed between the shafts 26 and 19 and comprises shiftable gear 27 splined on the shaft 26 which may be selectively engaged with a gear 28 fixed to the shaft 19 for effecting rotation of the spindle in one direction or indirectly coupled thereto by means of an intervening couplet 29 having one gear 30 adapted to mesh with the gear 27 and a gear 30' in constant mesh with the gear 28 for reversing the direction of spindle rotation.

The mechanism for shifting gear 27 is shown in more detail in Figure 4 and comprises the pivoted shifter fork 31 engaging the spool 31' on the gear which is actuated by the forked crank arm 32 secured to the end of rock shaft 33 journaled in the wall of the column. A manual operating lever 34 is attached to the exterior end of this shaft for determining the direction of rotation of the spindle.

The clutch 25 may be actuated by a suitable shifter fork 35 which is pivoted to a fixed part of the column and operated by the starting lever 36 having a crank arm 37 integral therewith, which is connected to the shifter fork by the connecting link 38.

The variable speed transmission in this invention is designed to yield 32 different speeds arranged in geometrical progression, and comprises a primary change speed set capable of yielding eight different rate combinations, this change speed set being coupled to the spindle through four different series, the final gears of the series being coupled to the spindle in progressive order in accordance with the speed and load transmitted whereby the gear which is to transmit the heaviest loads and lowest speeds will be adjacent the spindle nose while the gear which is to transmit the lightest loads and highest speeds will be adjacent the rear bearing.

The primary change speed set includes two shiftable couplets 39 and 40 splined on the shaft 19, the couplet 39 comprising gears 41 and 42 shiftable respectively into mesh with gears 43 and 44 fixed to the parallel shaft 45. The couplet 40 comprises the gears 46 and 47 shiftable into mesh with the gears 48 and 49 respectively which are also fixed on the shaft 45. An additional gear 50 is secured to the shaft 45 for selectively meshing with the gear 51 of the shiftable couplet 52, the other gear 53 thereof being movable into mesh with the gear 49. This couplet is splined on shaft 54 which has fixed thereto the couplet 55 comprising gears 56 and 57, and the couplet 58 comprising the gears 59 and 60. By means of the shiftable couplets 39, 40 and 52 it will be seen that the final shaft 54 of the primary speed change set which shaft may be considered as an intermediate shaft of the whole transmission may be rotated at eight different speeds.

The shaft 54 is coupled to the spindle 11 through four different series of rate changers respectively actuated by gears 57, 56, 60 and 59, and terminating in gears 61, 62, 63 and 64 attached to the spindle, the gear 61 being the largest in diameter and therefore attached to the spindle closest to the front bearing 65 thereof, the gear 64, being the smallest, attached to the spindle nearest the rear bearing 66 thereof, while gears 62 and 63 are spaced intermediate the largest and smallest gears in a uniform progression therewith.

The first two series of speeds are transmitted to the spindle through a branch transmission comprising a spline shaft 67 journaled in the column having three gears 68, 69 and 70 slidably mounted thereon, these gears being integrally connected together for simultaneous movement. The gear 68 is selectively shiftable into mesh with the fixed gears 56 and 57 which have the same pitch and number of teeth to thereby couple the branch transmission for actuation by shaft 54. Upon movement of the gear 68 into mesh with the gear 57, the gear 70 will be automatically moved into mesh with the large gear 61 on the spindle. Upon movement in the opposite direction to mesh gear 68 with fixed gear 56, the gear 69 will be moved into mesh with the gear 62. The gear 68 is also movable to a neutral position to disconnect the branch transmission from the primary change speed set. In this neutral position, it will be noted that both ends of the transmission are disconnected so that the gears will not even run idle but will remain stationary during non-transmission of power.

The second branch transmission comprises the splined shaft 71 having shiftably mounted thereon the couplet 72, comprising the gear 73 adapted to couple gear 60 with the gear 63 on the spindle, and the gear 74 which is adapted to mesh with the gear 64 upon movement of the gear 73 into mesh with the fixed gear 59. The gears 59 and 60 have the same pitch and the same number of teeth. This couplet also has a neutral position whereby each of these series is disconnected from the primary change gear set and also from the spindle.

It will thus be seen that a variable speed transmission has been provided comprising a primary change speed set capable of effecting eight different rates, and two branch transmissions, each branch comprising two series for coupling the change speed set to the spindle in four different speed ratios whereby the spindle may be selectively actuated at any one of 32 speeds.

It will be noted that the transmission comprises five shiftable elements and these elements may be shifted by any suitable means, it being preferable in the present invention to utilize power means, such as hydraulic pressure. Each shiftable element is therefore coupled to a pair of operating cylinders whereby the admission of pressure to one cylinder and the coupling of the opposed cylinder to reservoir will effect shifting in one direction while the reverse of these connections will effect movement in the opposite direction. Where necessary, the opposed cylinders may be simultaneously coupled to pressure to move the connected member to a neutral or non-power transmitting position.

As shown in Figure 3 a shifter fork 78 has been provided for the couplet 39, the fork being fixed to the piston 80, reciprocably mounted in opposed cylinders 81 and 82. Similarly the shifter fork 75 for the couplet 40 is fixed to piston 76 slidably mounted at opposite ends in pistons 77 and 79. The couplet 52 is provided with a shifter 83 mounted on piston 83', slidably mounted in opposed cylinders 84 and 85, while the couplet 72 and triple gear 68—69—70 are provided with shifters 86 and 87 respectively, the former being fixed to shifter rod 88 slidably mounted in cylinders 89 and 90, while the shifter 87 is fixed to the piston 91 slidably mounted in cylinders 92 and 93.

These cylinders are connected by individual piping to the selector valve 94 rotatably mounted in the speed change bracket 95 attached to the side of the column as shown in Figure 1. Hydraulic pressure is connected to this valve through a channel 96 which may be connected to a pump or other suitable source of pressure in the machine. One revolution of the valve is divided into 32 stations and the valve is so arranged that at each one of these stations pressure will be admitted to the proper cylinders to effect the 32 speeds in a continuous increasing geometrical progression. Since such a valve is known in the art, further description thereof is not believed to be necessary. The valve may be power rotated by means of a power shaft 97, which may be coupled to the prime mover by suitable clutch means, the shaft having a gear 98 thereon meshing with a similar gear 99 fixed to the selector valve drive shaft 100. The coupling of the shaft 97 to a source of power may be manually controlled by a control lever 101 secured to the side of the speed change bracket or by the manual control lever 102 rotatably mounted on the forward side of the saddle whereby the same may be controlled from either the front or rear of the machine.

It will be noted that the shiftable couplets 39 and 40 are mounted upon the same shaft 19 and therefore only one couplet can be moved to a power transmitting position at any one time. Similarly the gears 69, 70 and couplet 72 are all adapted to mesh with the gears on the spindle in different ratios and therefore only one of these four gears can be in mesh at one time. For this reason an inter-lock 103 has been provided between the pistons 76 and 80 and pistons 88 and 91 which prevents the movement of the one couplet into power transmitting position until the other couplet has been withdrawn to a neutral position. Such an interlock mechanism suitable for this purpose is shown in Figures 5, 6 and 7. To this end each of the pistons 76 and 80 have sleeves mounted on opposite ends thereof inside of the respective cylinders; and since the construction of each unit is the same, only one will be described. The piston 80 in Figure 7 has a sleeve 104 on each end thereof which is movable longitudinally and independently of the piston. These sleeves have an enlarged portion 105 within the respective cylinders 81 and 82 which form shoulders adapted to engage the end closure plates 106. The operation is as follows: When pressure is admitted to both ends of the cylinder, the pressure acts not only upon opposite ends of the piston itself but upon the enlarged ends of the sleeves; and since the sleeves may move independently of the piston rod, they both move toward one another until their respective shoulders engage the respective end plates. This will cause the shifter to move to a central position because equal pressures are acting upon opposite ends of the piston rod per se which equalize and therefore create no resistance to the movement imparted by the sleeves. If, while in a neutral position, fluid pressure is now admitted to one cylinder and the other cylinder is connected to exhaust, it will be apparent that the fluid in the cylinder under pressure will act on the end of the piston as well as the end of the sleeve; but since the sleeve cannot move due to engagement between the shoulder thereof and the end closure plate, the pressure will act on the end of the piston and cause the same to move independently of the sleeve; and this movement will be unopposed due to the fact that the other cylinder is connected to exhaust. It is thus possible by controlling the admission of pressure to the cylinders to move the shifter to any one of three positions.

Each shifter arm is provided with a flat surface as shown in Figure 5 on which surfaces are mounted the interlocking elements. Attached to the flat surface of arm 78 and movable therewith is a block 107 having a semi-circular cut-out portion as shown in Figure 6. Attached to the arm 75 and movable therewith is the rectangular block 108 and pin 109. Pivoted in a fixed portion of the machine is the semi-circular lock piece 110 having a V-shaped groove 111. The operation of this structure is that upon reciprocation of the arm 75 to its neutral position, for instance, the pin 109 will engage the V-shaped groove and rotate the lock member 110 so that its flat side will be horizontal as viewed in Figure 6. As soon as the flat surface 112 of the lock member 110 attains a horizontal position it permits the block 107 and thereby the arm 78 to move under fluid pressure to shift its gear couplet. As soon as the block 107 moves, one of its flat surfaces 113 will engage the flat surface 112 of the lock member and thus prevent rotation thereof and thereby retain the block 108 and its arm 75 in neutral position. It is thus seen that when the surfaces 112 and 113 are parallel with one another and the blocks 107 and 108 are in vertical alignment, both shifter means are in a neutral position and either one may be moved; but the movement of one will immediately prevent the movement of the other. It is also true that when one shifter arm has been moved so that its gear couplet is in driving engagement, then the other shifter arm and its gear couplet cannot be moved into driving engagement until the first shifter arm has returned its gear couplet to neutral position.

It will be noted from the above that the shifter arms are moved to neutral position only when pressure is admitted to each cylinder of the one piston, but when pressure is admitted to the cylinder at one end of the piston and the other cylinder is connected to exhaust, the pressure differential between the cylinders will cause the piston to move and carry with it its shifter arm. The shifter arm will in turn move the sleeve that is in the cylinder which is connected to exhaust and this makes it possible to move the attached gear couplet from neutral position to driving engagement. The spring pressed balls 114 acting in detents 115 hold the arms in their various positions.

An improved transmission and control mechanism for the cutter spindle of a milling machine has thus been provided having a selection of 32 speeds, the higher rates of which make possible the use of improved high speed cutting tools, while the lower rates are suitable for the transmission of large power and torque necessary for heavy milling operations.

That which is claimed is:

1. In a variable speed transmission the combination of a primary shaft, an intermediate shaft, a plurality of change speed elements for operatively coupling one shaft to the other in eight different speed ratios, a final member, parallel change speed sets interposed between the intermediate shaft and the final member, means for coupling either set in serial power transmitting relationship with the intermediate shaft to effect actuation of the final member at a plurality of speed rates for each set, and means to render one set inoperative during actuation of the other.

2. In a variable speed transmission the combination of a primary shaft, an intermediate shaft, a plurality of change speed elements for operatively coupling one shaft to the other in eight different speed ratios, a final member, parallel change speed sets interposed between the intermediate shaft and the final member, means for coupling either set in serial power transmitting relationship with the intermediate shaft to effect actuation of the final member at a plurality of speed rates for each set, means to render one set inoperative during actuation of the other, and interlocking means to prevent movement of one set to a power transmitting position until the other set has been withdrawn therefrom.

3. In a variable speed transmission, the combination of a first change speed set terminating in a shaft, means to adjust said set to yield eight different rates of rotation in the shaft, a final member, branch change speed sets each having a plurality of rate positions extending from said shaft to the final member, a shiftable member in each branch for selectively coupling either branch in serial power transmitting relationship between said shaft and the final member, power means for moving the shiftable members, and an inter-lock to prevent movement of one member to a power transmitting position until the other member has been withdrawn therefrom.

4. In a variable speed transmission, a first change speed set including a power shaft, second shaft, a plurality of coaxially shiftable members for coupling the power shaft to the second shaft in four different ratios, a final shaft, an additional shiftable element for coupling the intermediate shaft to the final shaft in two different ratios whereby the final member may be selectively actuated at eight different speeds, an ultimate driven member, branch transmissions for coupling the final shaft to the ultimate member, each branch transmission having a shiftable element, for effecting said coupling in two different ratios, power means for actuating all of said elements in predetermined order to effect a geometrical progression of speed rates, and interlock means between the members of the first pair and the member of the last pair of shiftable members to prevent movement of one member to a power transmitting position until the other has been withdrawn therefrom.

5. In a milling machine having a column, a cutter spindle journaled in the column, and front and rear bearings for supporting said spindle, the combination of means for rotating said spindle at different rates comprising a series of gears attached to the spindle, said gears decreasing progressively in size from the front spindle bearing, means to actuate the spindle at variable speeds including a first change speed mechanism terminating in an intermediate shaft, said mechanism including shiftable units selectively positionable to actuate said shaft at eight different speeds and a plurality of change speed gear sets, each serially arranged between the intermediate shaft and the spindle, each set having final members adapted to mesh with respective gears on the spindle whereby the primary change speed set may be connected to the spindle in as many different ratios as there are gears on the spindle.

6. A variable speed transmission comprising a change speed mechanism terminating in a driven shaft, said mechanism including three shiftable units whereby the shaft may be actuated at eight different speeds, an ultimate driven member, branch transmissions arranged in parallel between the shaft and said member, one of said branch transmissions including a shiftable unit comprising two gears of different ratio, a pair of gears fixed to the driven shaft, a second pair of gears fixed to the spindle, means to shift the unit in one direction to cause one gear thereof to couple together a member of each of said pairs or in the other direction to effect coupling of the remaining members of each pair to thereby effect rotation of the spindle at sixteen different speeds, and means in the other branch transmission to couple the shaft to the spindle in two different ratios to effect an additional sixteen speeds of rotation of the spindle.

7. A variable speed transmission comprising a change speed set terminating in a driven shaft, said set including three shiftable units whereby the shaft may be actuated at eight different speeds, an ultimate driven member, branch transmissions arranged in parallel between the shaft and said member, one of said branch transmissions including a shiftable unit comprising three gears, a pair of gears fixed to the driven shaft, means to shift the unit to selectively mesh one of said gears thereof with either of said gears on the shaft, a second pair of gears affixed to the spindle whereby upon movement of the unit a member of each pair of units will be coupled together and upon movement in the other direction the remaining members of each pair will be coupled together whereby the spindle may be actuated at sixteen different speeds, and means in the other branch transmission to couple the shaft to the spindle in two additional ratios whereby the spindle may be selectively actuated at any one of thirty-two speeds.

8. A variable speed transmission comprising a change speed mechanism terminating in a driven shaft, said set including three shiftable units whereby the shaft may be actuated at eight different speeds, an ultimate driven member, branch transmissions arranged in parallel between the shaft and said member, one of said branch transmissions including a shiftable unit comprising two gears, a pair of gears fixed to the spindle, means to shift the unit in one direction to effect coupling of one gear of the unit with a gear of said pair and in the opposite direction to effect coupling of the other gear of the unit with the remaining gear of the pair, means to simultaneously couple the branch transmission to the driven shaft in the same ratio upon movement of the unit in either direction to yield sixteen speeds; the other branch transmission comprising a shiftable unit of three gears, a second pair of gears fixed to the spindle, means to shift the unit to couple one of the gears of the unit with a gear of said second pair and in the opposite direction to mesh a second gear of the unit with the remaining gear of said pair, means to automatically connect the third gear of said unit with said driven shaft upon movement of the unit to either power transmitting position whereby an additional sixteen speeds may be selectively imparted to the spindle.

9. A variable speed transmission comprising a change speed mechanism terminating in a driven shaft, said mechanism including three shiftable units whereby the shaft may be actuated at eight different speeds, an ultimate driven member, branch transmissions arranged in parallel between the shaft and said member, each branch transmission having a shiftable unit, each unit having a neutral position and a power transmitting position on each side thereof, means to shift the units to either power transmitting position to effect coupling of the branch transmission to the spindle and simultaneously effect coupling of the driven shaft to the branch transmission whereby the branch transmission that is in neutral position will be stationary during power transmission by the other branch.

10. A variable speed transmission comprising a change speed mechanism terminating in a driven shaft, said mechanism including three shiftable units whereby the shaft may be actuated at eight different speeds, an ultimate driven member, branch transmissions arranged in parallel between the shaft and said member, each branch transmission comprising a shaft serially arranged between the driven shaft and the spindle, means to couple one branch transmission shaft to the driven shaft in a given ratio, means to couple the other branch transmission shaft to the driven shaft in a different ratio, and shiftable units in each branch transmission for coupling the respective branch transmissions to the spindle in two different ratios whereby the spindle may be selectively actuated at any one of thirty-two speeds.

11. In a variable speed transmission the combination of a power shaft, an intermediate shaft, a plurality of shiftable change speed elements for coupling one shaft to the other in eight different speed ratios, a final member, branch change speed sets extending from the intermediate shaft to the final member, means to couple one branch change speed set to the intermediate shaft in a ratio less than one, means to couple the other branch change speed set to the intermediate shaft in a ratio greater than one whereby one branch will always be rotated at a rate lower than the intermediate shaft thereby forming a low speed branch, and the other will be rotated at a speed which is always higher than the intermediate shaft thereby forming a high speed branch, and shiftable gears in each branch transmission for varying the respective ultimate rates imparted to the final member.

12. In a variable speed transmission the combination of a power shaft, an intermediate shaft, a plurality of shiftable change speed elements for coupling one shaft to the other in eight different speed ratios, a final member, branch change speed sets extending from the intermediate shaft to the final member, means to couple one branch change speed set to the intermediate shaft in a ratio less than one, means to couple the other branch change speed set to the intermediate shaft in a ratio greater than one whereby one branch will always be rotated at a rate lower than the intermediate shaft thereby forming a low speed branch, and the other will be rotated at a speed which is always higher than the intermediate shaft thereby forming a high speed branch, shiftable gears in each branch transmission for varying the respective ultimate rates imparted to the final member, and means to render one branch transmission inoperative during actuation of the final member by the other.

13. In a milling machine having a column, a cutter spindle journaled in the column, and front and rear bearings for supporting the spindle in the column, the combination of means for rotating the spindle at different rates comprising four final gears attached to the spindle, said gears gradually decreasing in size and arranged in said order, the largest gear being adjacent the front bearing, a primary change speed set including shiftable units for effecting four speeds, a second change speed set including a shiftable unit movable to two positions to multiply the four speeds into eight speeds, said second change speed set terminating in a driven shaft, said shaft having a first pair of gears of equal size affixed thereto, and a second pair of gears of equal size but of unequal size relative to said first pair of gears, and means serially arranged between each of said pairs of gears on the driven shaft and respective pairs of gears on the spindle for coupling the shaft to the spindle in four different ratios and thereby multiplying the eight speeds into thirty-two speeds.

LESTER F. NENNINGER.